United States Patent [19]

Sato

[11] Patent Number: 5,028,187
[45] Date of Patent: Jul. 2, 1991

[54] SECURITY FASTENER INCLUDING INTEGRAL PLUG BODY AND SOCKET BODY

[75] Inventor: Seiichi Sato, Kanagawa, Japan
[73] Assignee: Kato Hatsujo Kaisha, Ltd., Yokohama, Japan
[21] Appl. No.: 462,509
[22] Filed: Jan. 8, 1990

[30] Foreign Application Priority Data

Aug. 31, 1989 [JP] Japan ............................ 1-225258

[51] Int. Cl.⁵ ............................................ F16B 13/06
[52] U.S. Cl. ........................................ 411/48; 411/41; 411/60
[58] Field of Search ...................... 411/41, 45–48, 411/44, 60, 908; 24/297, 453

[56] References Cited

U.S. PATENT DOCUMENTS

| | | | |
|---|---|---|---|
| 4,122,583 | 10/1978 | Grittner et al. | 24/208 A |
| 4,312,614 | 1/1982 | Palmer et al. | 411/41 |
| 4,377,358 | 3/1983 | Wallar | 411/15 |

FOREIGN PATENT DOCUMENTS

| | | |
|---|---|---|
| 58-3924 | 1/1983 | Japan . |
| 60-21537 | 6/1985 | Japan . |
| 61-50810 | 4/1986 | Japan . |
| 62-2325 | 1/1987 | Japan . |
| 62-246609 | 10/1987 | Japan . |

Primary Examiner—Neill R. Wilson
Attorney, Agent, or Firm—Foley & Lardner

[57] ABSTRACT

According to the invention, there is provided a coupler which is realized in the form of an integral unit made of an elastic synthetic resin material which is free from any risk of losing any of its components and can be temporarily but securely held in aligned bores of the plaques it is going to couple once it is introduced into the bores so that the plug body of the coupler may be pushed into the socket body with ease. Moreover, since the socket body of the coupler firmly held in the bores of the plaques to be coupled and the plug body pushed into said socket body are connected with each other by means of a pair of thin support members to form an integral coupler unit, said plug body can be pushed into said socket body with a relatively small force to securely rigidly couple the plaques. As there are no parts of the unit which are prone to damage, it is good for repeated use.

6 Claims, 6 Drawing Sheets

SECURITY FASTENER INCLUDING INTEGRAL PLUG BODY AND SOCKET BODY

BACKGROUND OF THE INVENTION

1. Field of the Invention

This invention relates to a coupler made of a flexible material and designed for coupling two or more plaques by introducing said coupler into aligned bores of said plaques.

2. Prior Art

There have been known various couplers of this category including those disclosed in Japanese Pat. Publication Nos. 58-3924, 62-2325 and 60-21537 as well as in Japanese Pat. Disclosure No. 62-246609 and Japanese Utility Design Disclosure No. 61-50810.

All the couplers disclosed in the above cited documents consists of two separate components, of which one is a cap body for being fitted into aligned bores of the plaques to be coupled by the couple and the other is a pin body for being introduced into a central recess of said cap body. Two or more plaques can be coupled together by introducing the pin body into the cap body which has been fitted into aligned bores of the plaques as a ring-shaped projection formed on said pin body outwardly pushes the cap body so that the cap body is accordingly expanded outwards and pressed hard against the side wall of the aligned bores to hold the plaques together in a coupled condition.

Therefore, any of the couplers as described above can not achieve the objective of coupling plaques until two separate components are brought to an interlocked condition in some way or another.

For manufacturing such couplers, the number of manufacturing steps is inevitably large because at least two separate components are involved for each unit. This in turn offers a high probability of missing components during manufacturing and shipping as well as in actual coupling operations. Moreover, interlocking two separate components entails strict dimensional requirements to be observed for precision.

In order to get rid of the above and other problems, there have been proposed integrally formed couplers or couplers having only one component.

Figure 9A:
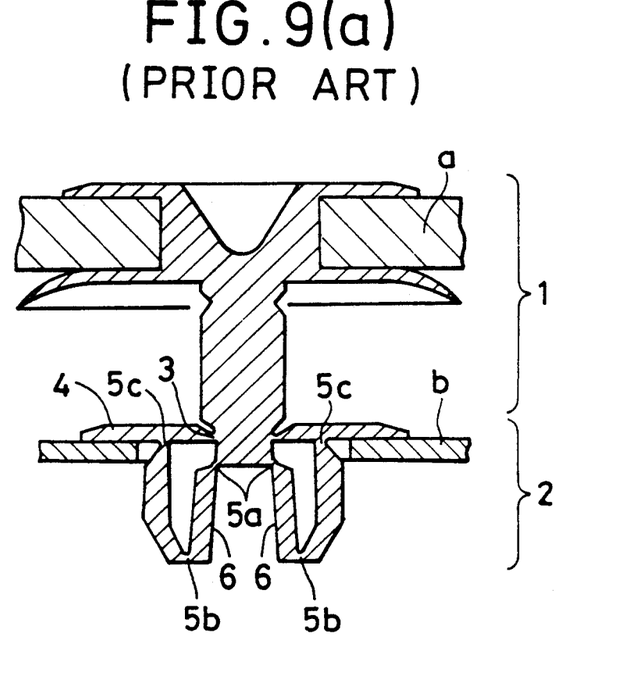
FIGS. 9(a) and 9(b) are axial sectional views of a conventional coupler, respectively illustrating its conditions before and after it is finally set.
Figure 9B:
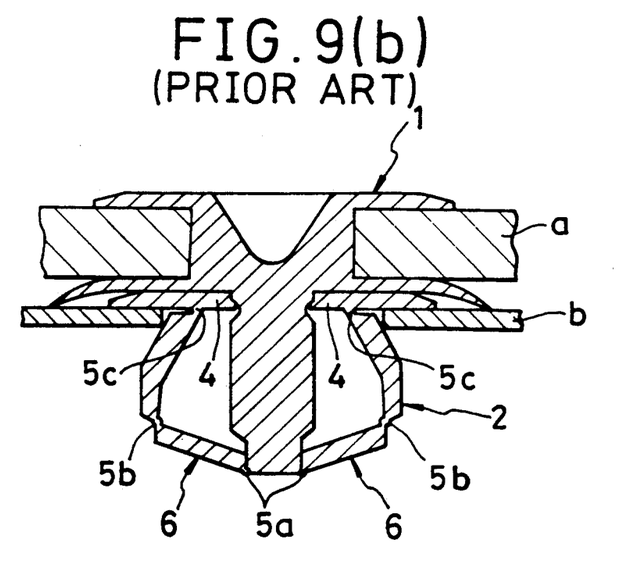

FIGS. 9(a) and (b) of the accompanying drawings illustrate a one-component coupler disclosed in U.S. Pat. No. 4,122,583. As shown in FIG. 9(a), a coupler according to this document comprises a trunk body 1 for holding a plaque a and a leg body 2 for holding a panel b to form an integral unit of coupler, said leg body 2 having a pair of flanges 4, 4 extending radially from the lower end of said trunk body 1 and connected respectively by hinges 3, 3 with it. As illustrated in FIG. 9(b), when the trunk body 1 is pushed down, said hinges 3, 3 are broken and the trunk body 1 goes down through the panel b until the lower end of the trunk body 1 and the flanges 4, 4 are firmly fitted onto the upper surface of the panel b as a pair of arms 6, 6 articulated by three pairs of hinges 5a, 5a, 5b, 5b and 5c, 5c are bent upward to support the respective flanges.

Since the coupler as described above is so designed as to rigidly hold the panel b when the trunk body 1 pushed down and the hinges 3, 3 are broken by the downward motion of the trunk body 1, the coupler is irreversibly deformed, and cannot be reused. Moreover, since the leg body 2 comprises pairs of hinges 5a, 5a, 5b, 5b and 5c, 5c, it is mechanically fragile and does not have enough resistance against external force and/or vibration when it is in use. These and other problems that accompany a coupler according to the above teaching make it poor for practical applications.

Figure 10A:
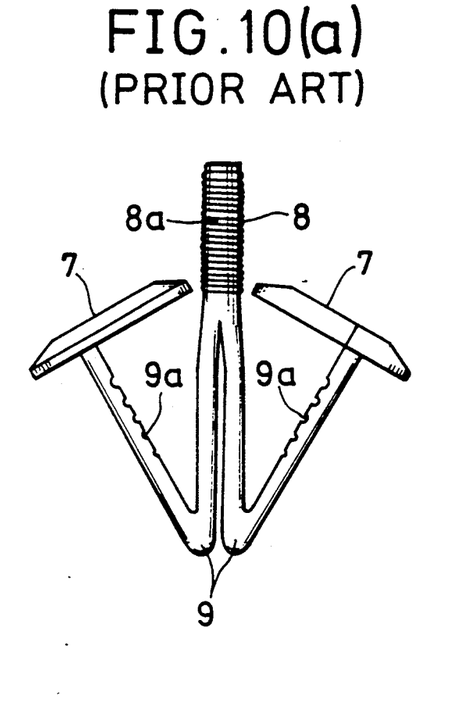
FIGS. 10(a), 10(b) 10(b) front views of another conventional coupler, respectively illustrating conditions before and after it is assembled and after it is set in position.
Figure 10B:
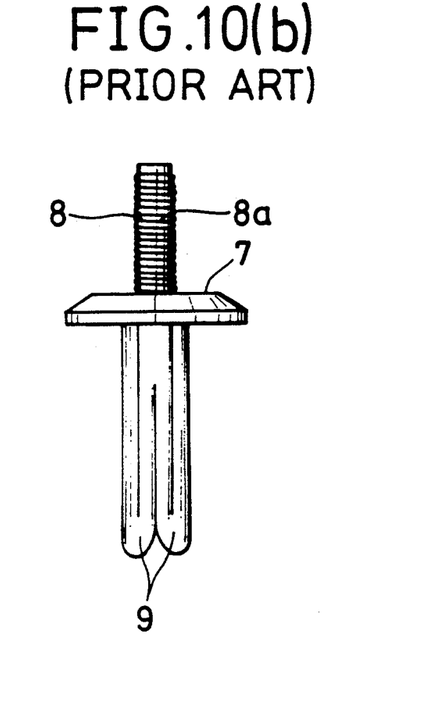
Figure 10C:
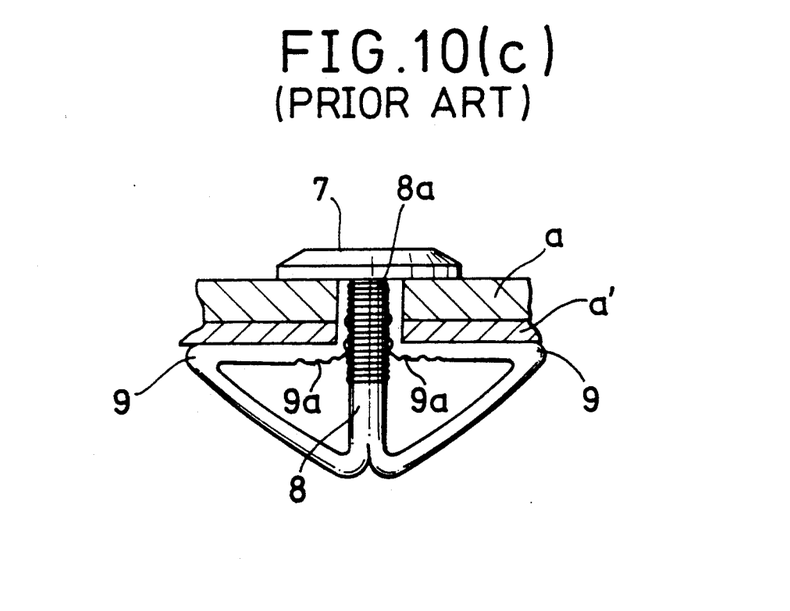

FIGS. 10(a), 10(b) and 10(c) of the accompanying drawings illustrate another coupler disclosed in U.S. Pat. No. 4,377,358.

As best seen in FIG. 10(a), another coupler comprises a pair of flanges, between which is an axial rod 8 which is cleaved to form a pair of branch arms 9, 9 extending downwardly, which are then bent upward as that both ends of the branch arms 9, 9 are connected to the respective flanges 7, 7.

After the flanges 7, 7 are put together as shown in FIG. 10(b), the axial rod 8 is pushed down as shown in FIG. 10(c) to laterally extend the branch arms 9, 9 which then presses plaques a and a' upward to rigidly couple them. At this stage, notched sections 9a, 9a of the branch arms 9, 9 are interlocked with a catch 8a of the axial rod 8.

With such an arrangement, if it is tried to forcibly remove the coupler from the plaques a and a' to reuse the unit, it can be easily damaged as the load placed by the plaques on the unit is by far larger than the one applied by the plaques when the unit is introduced into the aligned bores of the plaques, making any reuse of the unit practically impossible.

Moreover, a coupler as illustrated in FIG. 9 can not be temporarily, but securely, held in the bore of the panel b when the leg body 2 is introduced therein and consequently it can drop from the panel b at any time when it is in the bore, being very unstable during the operation of receiving the trunk body 1 from above. Similarly, a coupler illustrated in FIG. 10 can not be securely held in the aligned bores of the plaques a, a' until the axial rod 8 is thrusted into the aligned bores. Therefore it is precariously contained as shown in FIG. 10(b).

It is, therefore, an object of the present invention to provide a coupler in the form of an integral unit and, hence, free from any troublesome operation of combining two or more components or any risk of finding missing any components when coupling plaques, and which is capable of being temporarily, but securely, held in aligned bores of the plaques and/or panels to be coupled by the coupler, eliminating any possibility for the components to unintentionally come loose from the bores and consequently securely pushed into the bores of the plaques.

It is another object of the invention to provide a coupler with which the load charged thereto at the time of removing it from aligned bores of plaques is not significantly greater than the load applied thereto at the time of introducing it into the aligned bores so that it can be easily removed from the plaques for reuse whenever necessary without causing damages to the coupler.

SUMMARY OF THE INVENTION

According to the invention, the above and other objects of the invention are achieved by providing a coupler comprising a plug body consisting of a large pushing head member and a pillar member projecting coaxially downwardly from the lower surface of said large pushing head member and a socket body for receiving said plug body, said socket body consisting of a V-shaped guiding tip member having a pair of guide legs arranged below said pillar member with a distance provided therebetween and a pair of flanges respectively connected with said pair of guide legs by way of a pair of side members standing upward around said pillar member, said flanges being so arranged that they can be tightly fitted to one of the plaques to be coupled by the coupler, said coupler further comprising a pair of thin support members extending downwardly outwardly from said guiding tip member of said pillar member and respectively being connected with said guide legs so that said coupler can be integrally formed by a flexible synthetic resin material with a space provided between said plug body and said socket body.

Preferably, a coupler according to the invention comprises a plug body consisting of a large pushing head member and a pillar member projecting coaxially downwardly from the lower surface of said large pushing head member and a socket body for receiving said plug body, said socket body consisting of a pair of flanges respectively connected with a pair of side members standing upward around said pillar member, said flanges being so arranged that they can be tightly fitted to one of the plaques to be coupled by the coupler, said coupler further comprising a pair of thin support members extending downwardly outwardly from said guiding tip member of said pillar member and respectively being so connected with said guide legs that said coupler can be integrally formed by a flexible synthetic resin material with a space provided between said plug body and said socket body.

Alternatively, a coupler according to the invention may be provided with a catch on the pillar member of the plug body and a pair of projecting members respectively so arranged on the side members that said projecting members are interlocked with said catch when said plug body is pushed into said socket body which is tightly fitted into aligned bores of plaques.

Still alternatively, a pair of thin support members may be provided on the pillar member respectively in juxtaposition with the pair of side members of a coupler according to the invention.

Now the present invention will be described in greater detail by referring to the accompanying drawings which illustrate preferred embodiments of the invention.

DETAILED DESCRIPTION OF THE INVENTION

As shown in FIGS. 1 through 4 that schematically illustrates a first embodiment of the invention, a coupler 10 according to the invention comprises a plug body 20 constituted by an enlarged pushing head member 21 and a pillar member 22 coaxially and downwardly projecting from said head member and a socket body 30 for receiving said plug body 20, said socket body 30 being constituted by a guiding tip member 34 realized in the form of a V-shaped hairpin having a pair of guide legs 34a, 34a and located below the free end 24 of said pillar member 22 of said plug body 20 and a pair of left and right flanges 32, 32 respectively located above and connected by way of a pair of side members 31, 31 to the top portions of said guide legs 34a, 34a so that they come in close contact with a plaque as described later, said plug body 20 and said socket body 30 being connected with each other by means of a pair of flexible thin support members 26, 26 extended outwardly downwardly from the tapered free lower end 24 of said pillar member 22 to said guide legs so that said plug body 20 and said socket body 30 forms an integral unit with the V-shaped socket body 30 arranged around the periphery of the plug body 20 with a distance provided therebetween.

More specifically, while this embodiment may be made of any moldable and flexible material such as synthetic resin and preferably it is formed by molding a relatively highly durable and elastic material such as polyamide resin or polyacetal resin.

Figure 1:
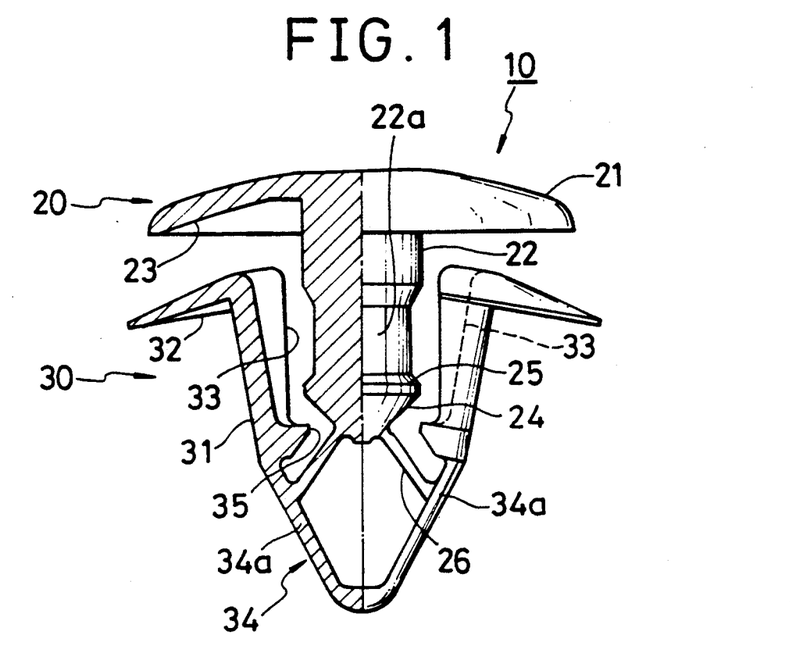
FIG. 1 is a front view of a first embodiment of the invention showing its left half in a cut-out state.
Figure 2:
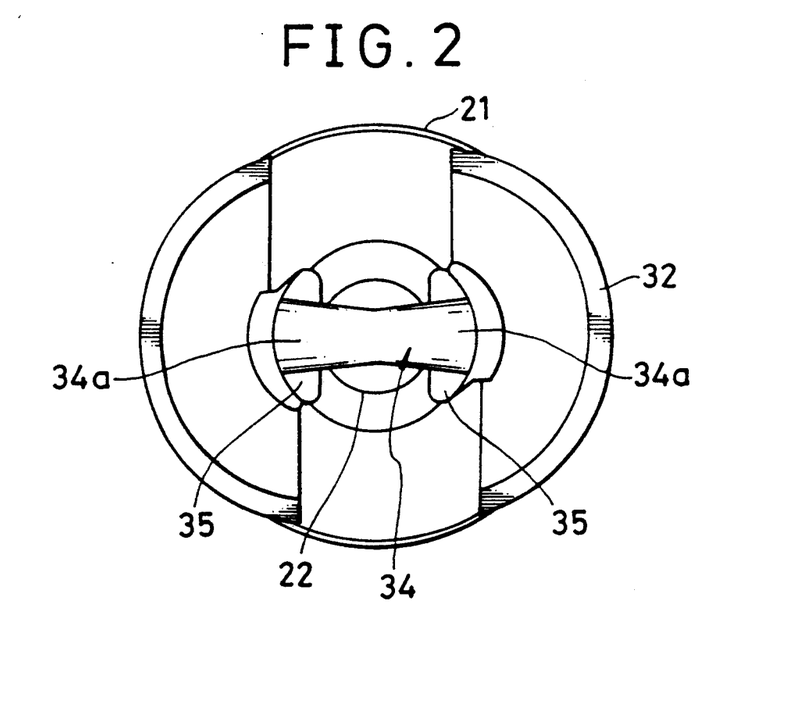
FIG. 2 is a plan view of the embodiment of FIG. 1 as it looks from below.
Figure 3:
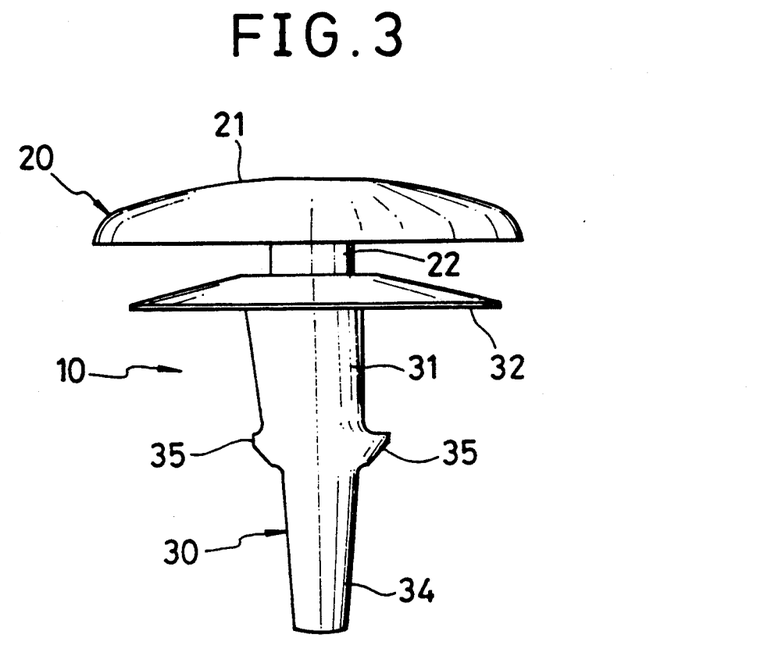
FIG. 3 is a side view of the embodiment of FIG. 1 as seen from its right side.

It should be noted that, as described above, said plug body 20 is constituted by a pushing head member 21 and a pillar member 22 downwardly extending from the lower surface of said pushing head member 21 and that said pushing head member 21 is realized in the form of a saucer placed upside down whose inner surface has a slope 23 to form the recess of the saucer as illustrated by the sectional view of the left half of FIG. 1.

The pillar member 22 in the form of a cylindrical column is extending downwardly from said pushing head member 21 and has a slenderized portion 22a at the middle thereof in the longitudinal direction and a catch 25 is provided on the pillar member 22 between said slenderized portion 22a and said tapered free lower end 24 of the pillar member 22 to form a bulged portion on said pillar member 22.

Again as described above, a pair of thin support members 26, 26 extending outwardly downwardly from the tapered free lower end 24 in the left and right directions as viewed in FIG. 1 are respectively connected onto the guide legs 34a, 34a of said guiding tip member 34 in such a manner that said socket body 30 may be deformed as it is laterally expanding when an external downward force is applied to the coupler 10. With such an arrangement, the plug body 20 and the socket body 30 form an integral coupler unit.

As shown in FIG. 1, the socket body 30 comprises a pair of outwardly tapered flanges 32, 32 arranged to the left and right of the outer periphery of said pillar member 22 of the plug body 20 with a given distance provided between the flanges and the pillar member and a pair of side members 31, 31 respectively extended downward from the inner edges of said flanges 32, 32 and connected to said guide legs 34a, 34a. Each of said side members 31, 31 has a rounded area 33 surrounding a portion of the pillar member 22 so that, when the socket body 30 is introduced into a bore of a plaque with the guiding tip member 34 leading the body, the side members 31, 31 can be deformed and tightly pressed against the pillar member 22 to be temporarily but securely held there.

The V-shaped configuration of said guiding tip member 34 comprising a pair of guide legs 34a, 34a which are arranged around the outer periphery of said pillar member 22 is advantageous particularly when it is introduced into a fitting bore and therefore can enhance the efficiency of the operation of coupling plaques.

Each of said flanges 32, 32 is realized in the form of a half-ring shape which is tapered toward the outer periphery thereof so that they can be completely covered by the large pushing head member 21 when the latter is pressed downward as the coupler is placed in a bore of a plaque. The operation of pushing down the large pushing head member 21 for coupling plaques will be described later in detail.

A pair of projecting members 35, 35 are provided on the inner periphery of the socket body 30 at a relatively low level thereof and stretching respectively into a pair of spaces formed below the pillar member 22 or, more specifically, between the tapered free lower end 24 and the thin support members 26, 26.

Figure 5:
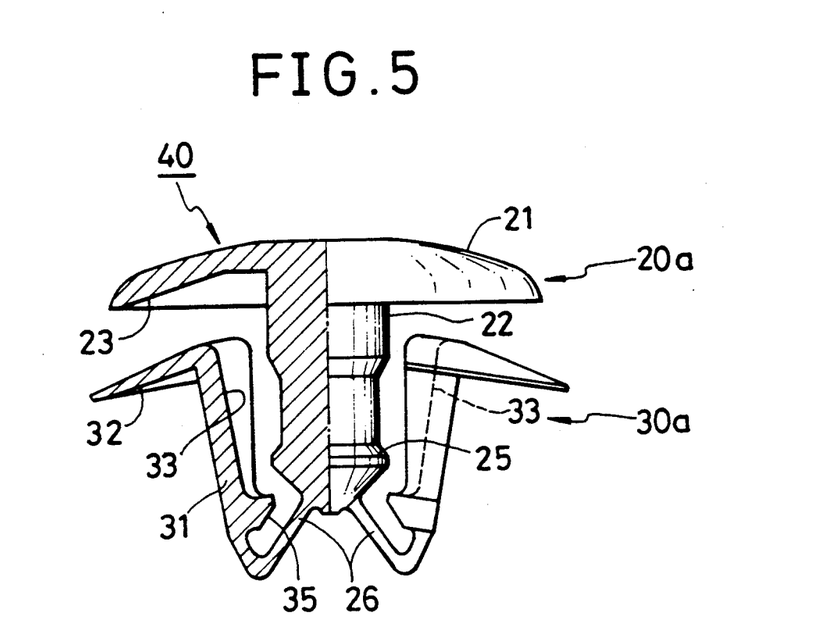
FIG. 5 is a front view of a second embodiment of the invention, showing its left half in a cut-out state.
Figure 6:
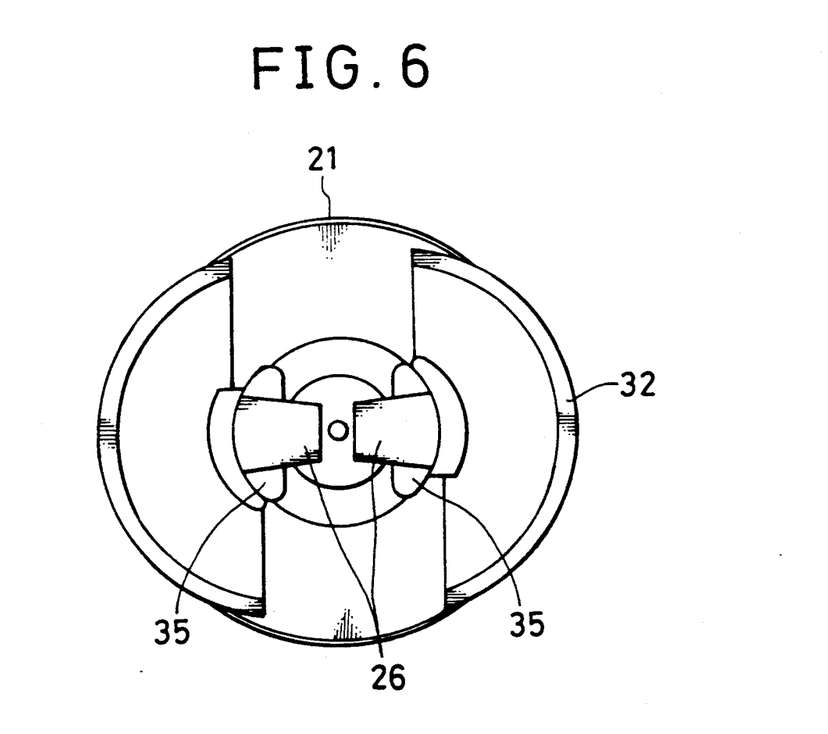
FIG. 6 is a plan view of the embodiment of FIG. 5 as seen from below.

FIGS. 5 and 6 show a second embodiment of the invention comprising, like the first embodiment, a plug body 20a constituted by an enlarged pushing head member 21 and a pillar member 22 coaxially and downwardly projecting from said head member and a socket body 30a for receiving said plug body 20a, said socket body 30a further comprising a pair of flanges oppositely positioned to the right and left of the outer periphery of said pillar member 22 so that they may come into a close contact with a plaque when the coupler 10 is applied thereto and a pair of side members 31, 31 respectively extended downwardly from the inner edges of said flanges 32, 32. Moreover, a pair of flexible thin support members 26, 26 are extended outwardly and downwardly from the free lower end 24 of the pillar member 22 and connected onto the side members 31, 31 of the socket body 30a so that said plug body 20a and said socket body 30a form an integral coupler unit.

It may be obvious that, although the second embodiment as described above has no guide legs 34a, 34a, its configuration is essentially the same as that of the first embodiment of the invention.

More specifically, the thin support members 26, 26 of the second embodiment are directly connected onto the corresponding lower ends of the side members 31, 31 so that the coupler unit has a couple of V-shaped leg-like members formed at the lower end of the socket body 30a.

Since all the other components are same as those of the first embodiment and denoted by the same reference numerals, they are not described any further.

Figure 7:
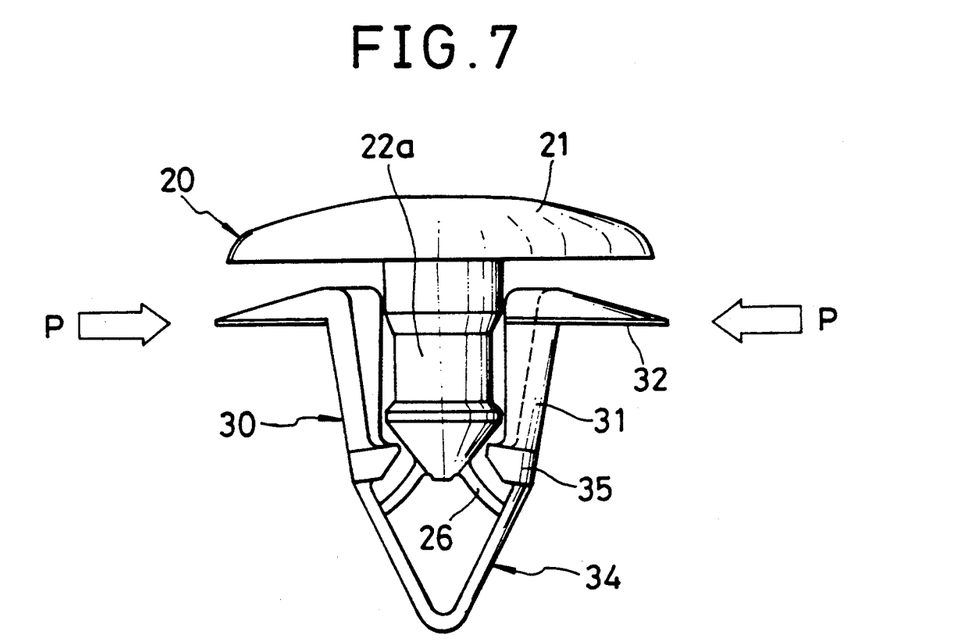
FIG. 7 is a front view of the first embodiment, schematically illustrating how it operates for temporary holding.

Now, a coupler as described above by referring to the first embodiment will be used for coupling plaques A and B in the following manner. As illustrated in FIG. 7, the socket body 30 of the coupler 10 is held by applying force in the directions indicated by arrows P, P so that the pair of side members 31, 31 of the socket body 30 are pressed against the periphery of the pillar member 22.

Figure 8:
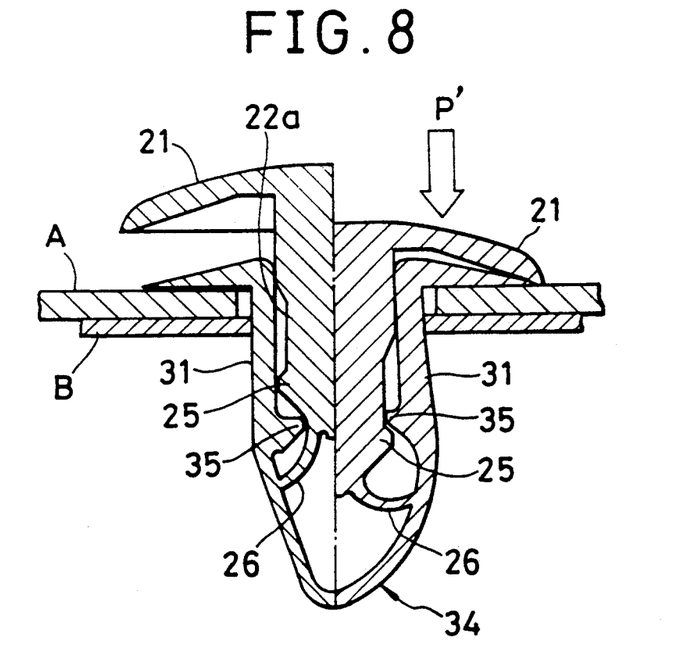
FIG. 8 is a sectional front view of the first embodiment schematically illustrating how its left half looks before being set in position and how its right half looks after it is finally set.

If the coupler is introduced into aligned bores of the plaques under this condition, the close contact of the plug body 20 and the socket body 30 is maintained in the bores as illustrated in the left half of the sectional view of the embodiment of FIG. 8.

Under this condition, because of the provision of the thin support members 26, 26, the guiding tip member 34 arranged at the bottom of the socket body 30 maintains its original form without being deformed to narrow the distance between the two guide legs 34a, 34a. Moreover, since the side members 31, 31 are brought into close contact with the pillar member 22 in the aligned bores, they are temporarily but securely held there without any risk for the coupler 10 to fall down and become lost.

In the next step, the large pushing head member 21 is pressed downward as indicated by arrow P', to move down the pillar member 22. The catch 25 arranged on it accordingly goes down until it reaches beyond the projecting members 35, 35 standing from the respective side members 31, 31, and stays there in a locked condition.

As a result, the thin support members 26, 26 are moved from the downwardly extending condition to a roughly horizontal condition to consequently deform the corresponding guide legs 34a, 34a to an outwardly rounded state.

Now the coupler 10 firmly and securely couples the plaques, and its advantage as an integral unit is realized.

Figure 4:
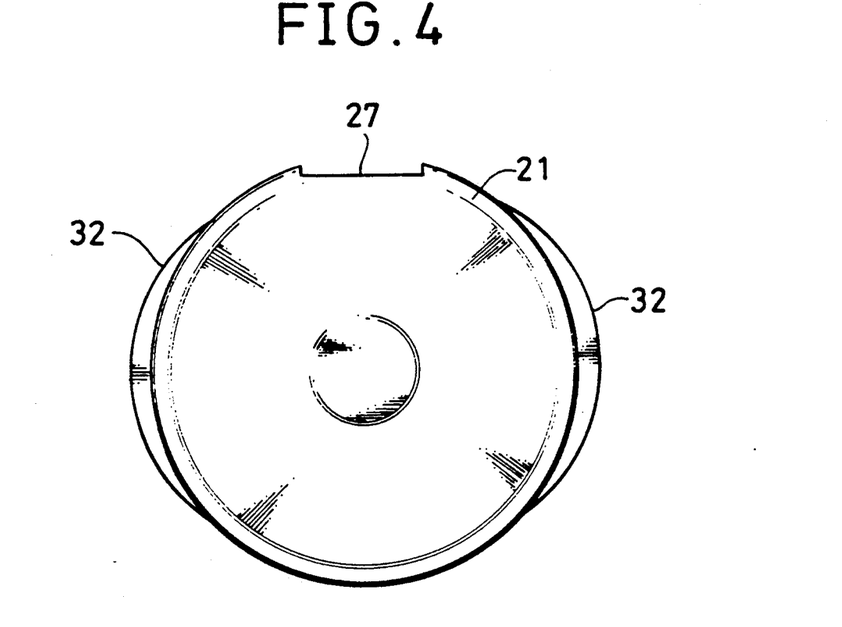
FIG. 4 is a plan view of the embodiment of FIG. 1 as seen from above.

If, as illustrated in FIG. 4, a notch 27 is formed on the outer periphery of the large pushing head member 21, the coupler may be removed from the plaques by simply introducing the tip of a jig under the large pushing head member 21 and pushing it up to release the plug body 20 from the locked condition.

As is apparent from the above description, since a coupler according to the present invention is realized as an integral unit made of an elastic synthetic resin material, it is free from any risk of losing any of its components and can be, temporarily but securely, held in aligned bores of the plaques it is going to couple, once introduced into the bores so that the plug body of the coupler may be pushed into the socket body with ease.

Moreover, since the socket body which is firmly held in the bores of the plaques to be coupled and the plug body which is pushed into said socket body are connected with each other by means of a pair of thin support members to form an integral coupler unit, said plug body can be pushed into said socket body with a relatively small force to securely and rigidly couple the plaques. As there are not any parts of the unit which are prone to damage, it is good for repeated use.

Besides, the operation of rigidly coupling plaques by means of a coupler according to the invention involves only an action of pushing the plug body into the socket body of the coupler that can be performed in a very simple way without requiring any tools such as screw drivers. Likewise, the operation of releasing the coupler from the plaques requires only a simple action of pulling out the plug body of the coupler from the socket body. Since the socket body comprises a couple of side members which are so configured as to be hardly subject to abrasion by the peripheral edges of the bores that receive the socket body, their original load bearing capacity will be maintained for a long period time and therefore the coupler will be good for repeated use.

A preferred embodiment of the present invention that has no guiding tip member 34 can be very easily introduced into or removed from aligned bores of plaques with a reduced level of workload for the introducing or the removing operation. Such an embodiment is also good for repeated use and hardly subject to damage caused by the peripheral edges of the bores that receive its socket body.

Another preferred embodiment of the present invention that has a catch arranged on the pillar member and a pair of projecting member arranged on the respective inner surface of the side members can be rigidly held in the bores that receive the socket body against large external force that may be applied thereto since said catch and said projecting members are engaged with each other once the large pushing head member of the plug body is pushed into the socket body to firmly couple plaques.

Still another preferred embodiment of the present invention that has a slenderized portion on the pillar member can contribute to enhance the level of security when the coupler is temporarily received by aligned bores of the plaques to be coupled, because the elasticity of the side members can be fully utilized.

What is claimed is:

1. A coupler comprising:
   a plug body having a large pushing head member and a pillar member projecting coaxially and downwardly from the lower surface of said large pushing head member; and
   a socket body for receiving said plug body, said socket body consisting of a V-shaped guiding tip member having a pair of guide legs arranged below said pillar member with a distance provided therebetween and a pair of flanges respectively connected with said pair of guide legs by way of a pair of side members around said pillar member, said flanges being so arranged that they can be tightly fitted by flexure to one of the plaques to be coupled by the coupler, said coupler further comprising a pair of thin support members extending downwardly and outwardly from said guiding tip member of said pillar member and respectively being connected with said guide legs so that said coupler can be integrally formed of a flexible synthetic resin material with a space provided between said plug body and said socket body.

2. A coupler comprising:
   a plug body having a large pushing head member and a pillar member projecting coaxially and downwardly from the lower surface of said large pushing head member; and
   a socket body for receiving said plug body, said socket body consisting of a pair of flanges respectively connected to a pair of side members around said pillar member, said flanges being so arranged that they can be tightly fitted by flexure to one of the plaques to be coupled by the coupler, said coupler further comprising a pair of thin support members extending downwardly outwardly from said guiding tip member of said pillar member and respectively being so connected with said guide legs that said coupler can be integrally formed by a flexible synthetic resin material with a space provided between said plug body and said socket body.

3. A coupler according to claim 1 wherein a catch is provided on said pillar member of said plug body and a pair of projecting members are respectively provided on said side members that said projecting members are interlocked with said catch when said plug body is pushed into said socket body which is tightly fitted into aligned bores of the plaques to be secured.

4. A coupler according to claim 1, wherein said pair of thin support members are provided on said pillar member in juxtaposition with said pair of side members.

5. A coupler according to claim 2, wherein a catch is provided on said pillar member of said plug body and a pair of projecting members are respectively provided on said side members that said projecting members are interlocked with said catch when said plug body is pushed into said socket body which is tightly fitted into aligned bores of plaques to be secured.

6. A coupler according to claim 2, wherein said pair of thin support members are provided on said pillar member in juxtaposition with said pair of side members.

* * * * *